(12) United States Patent
Sakai

(10) Patent No.: US 6,627,315 B2
(45) Date of Patent: Sep. 30, 2003

(54) ARTIFICIAL STONE

(75) Inventor: Mieko Sakai, Tokyo (JP)

(73) Assignee: Doppel Co., Ltd., Tokyo (JP)

(*) Notice: Subject to any disclaimer, the term of this patent is extended or adjusted under 35 U.S.C. 154(b) by 0 days.

(21) Appl. No.: 10/046,410

(22) Filed: Jan. 16, 2002

(65) Prior Publication Data

US 2002/0086122 A1 Jul. 4, 2002

Related U.S. Application Data

(63) Continuation of application No. 09/845,278, filed on May 1, 2001, now abandoned, which is a continuation of application No. 09/194,878, filed as application No. PCT/JP97/01169 on Apr. 4, 1997, now abandoned.

(51) Int. Cl.$^7$ .............................................. B32B 27/20
(52) U.S. Cl. ........................ 428/406; 428/15; 428/145; 428/147; 428/149; 428/150; 428/407; 428/403; 428/404; 428/402; 524/494; 52/316; 52/311.1; 40/124.5; 40/800
(58) Field of Search ...................... 428/15, 145, 147, 428/149, 150, 67, 406, 402, 403, 404, 407; 524/494; 52/316, 311.1; 40/124.5, 800

(56) References Cited

U.S. PATENT DOCUMENTS

5,422,391 A   6/1995   Inoue

FOREIGN PATENT DOCUMENTS

| JP | 60-137862 | 7/1985 |
| JP | 61-143133 | 6/1986 |
| JP | 6-87641 | 3/1994 |
| JP | 6-228321 | 8/1994 |
| JP | 6-345506 | 12/1994 |

*Primary Examiner*—Deborah Jones
*Assistant Examiner*—Wendy Boss
(74) *Attorney, Agent, or Firm*—Wenderoth, Lind & Ponack, L.L.P.

(57) ABSTRACT

The following artificial stone having a deep color tone and a glaze and having a luminousness is provided at low costs.

An artificial mixture in which a fine powder component of an inorganic material having a size of from 5 to 70 mesh is used, the sum of this fine powder component and a finely divided component of an inorganic material of 100 mesh-under is 89% by weight or more of the product and a resin component is 11% or less is struck and integrated into a cured slab which has been cured.

28 Claims, 4 Drawing Sheets

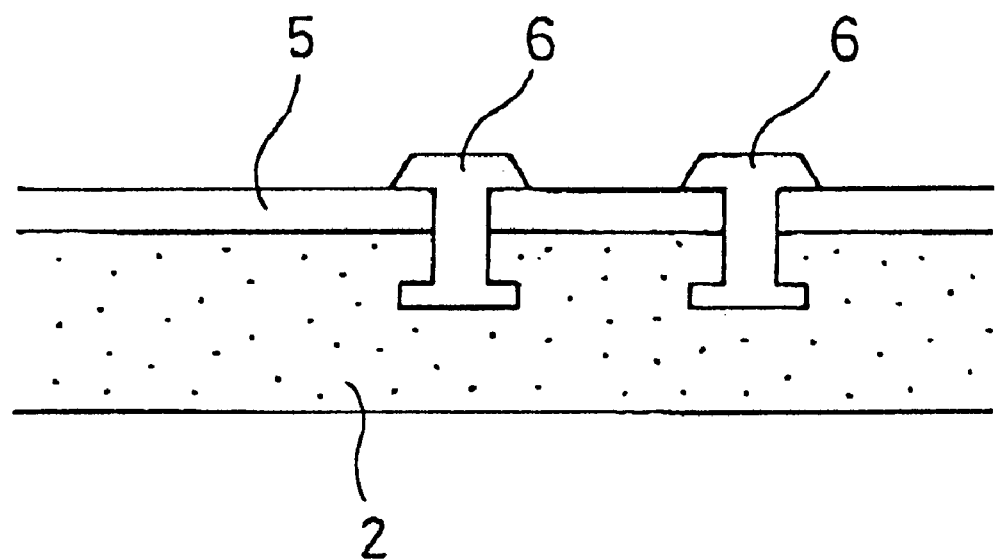

ARTIFICIAL STONE

This application is a continuation of Ser. No. 09/845,278, filed May 1, 2001, now abandoned, which is a continuation of Ser. No. 09/194,878, filed Mar. 4, 1999, now abandoned, which is a 371 application of PCT/JP97/01169, filed Apr. 4, 1997.

TECHNICAL FIELD

The present invention relates to an artificial stone. More specifically, the present invention relates to a novel improved high-density artificial stone which has a granite-like or marble-like excellent texture and excellent properties such as a good surface hardness, a good surface abrasion resistance and the like, which is light-weight and has a high hardness and a high strength, and which can easily be adjusted to a desired thickness at a low cost, and it is to provide an artificial stone which is useful as a wall material, a floor material, other building materials, materials for construction, a stone pillar or the like.

BACKGROUND ART

It has been already known so far that a natural stone is pulverized to an appropriate size, and mixed with calcium carbonate and a resin, and then cured to form an artificial stone. That is, it has been stated that a starting stone powder, a resin and the like are mixed under reduced pressure, and the mixture is poured into a mold, withdrawn therefrom and cut.

Further, it has been also known that when an artificial stone is produced using a powder of a natural stone and a synthetic resin, it is required that the starting materials are used at a predetermined mixing ratio and these are thoroughly pressurized after they are put into a mold.

However, artificial stones obtained by these conventional methods involve a problem that the color and the deep feeling are not necessarily satisfactory even if using the natural stone powder.

The conventional artificial stone had a defect that the color tone of the surface always becomes dull. Thus, in the past, it was quite difficult to realize a transparent, deep and massy granite-like or marble-like surface.

This is presumably because characteristics of light reflection or absorption on a surface of an artificial stone vary greatly depending on the composition and the size and the formulation of the artificial stone powder, but such a standpoint has not been heretofore studied so much.

And the composition of the artificial stone greatly influences a moldability. There are problems that a fluidity for molding in a mold is lost depending on a size or a ratio of a natural stone powder to be incorporated into an artificial stone, a ratio of a binder resin or the like and bubbles remain inside a molded product, notably impairing qualities and a strength of a product artificial stone.

It is also considered that an amount of a resin component is increased to improve a fluidity and prevent occurrence of bubbles.

Meanwhile, that an amount of a resin component is increased to prevent occurrence of bubbles and secure a fluidity for feeding into a mold helps provide a fluidity and prevent occurrence of bubbles, but has an adverse effect on qualities of a resulting artificial stone.

The use of the resin component in a large amount leads to production of a resinous artificial stone product, and the resulting product is nothing more than one in which an artificial stone powder is present in a resin. Further, in view of properties, the product is closer to the starting resin than to the starting stone. Accordingly, although the resulting stone is called an artificial stone, the resulting product is merely a resin product that looks like a stone.

Then, the inventors of the present application has provided a composition in which an inorganic material component comprises a fine powder component having a larger particle diameter and a finely divided component having a smaller particle diameter and a mixing ratio of a resin is approximately 10% by weight or less regarding such a novel artificial stone that when a powder of a natural stone or the like is used as a material upon solving such defects of the conventional artificial stone, the resulting product is of a dense texture, has characteristics such as a transparent color tone, a deep feeling and a tone of a natural stone such as granite, marble or the like and is excellent in a moldability so that an optional shape such as a plate, a bar or the like can be provided.

This artificial stone has attracted attention as a stone which is excellent in the color tone and the characteristics.

However, in the later studies, a problem has remained that when attempts are made to provide this new artificial stone composition having a thickness, the costs are increased in the formulation of the inorganic material component and the production. Further, problems have been left that the molded product is made to have more improved properties or designing.

DISCLOSURE OF INVENTION

Under the above-mentioned circumstances, the present invention has been made. In order to solve the above-mentioned problems, the sum of a fine powder component of an inorganic material having a size of from 5 to 70 mesh and a finely divided component of an inorganic material of 100-mesh under is 89% by weight or more based on the total amount of the product. It provides an artificial stone characterized in that an artificial stone mixture containing the inorganic material mixture component comprising the fine powder component of the inorganic material and the finely divided component of the inorganic material and 11% by weight or less, based on the total amount, of a resin component is struck and integrated into a cured slab which has been cured.

Further, the present invention provides an artificial stone characterized in that a curable mixture is struck and integrated into a cured slab which has been formed from the above-mentioned artificial stone mixture.

BRIEF DESCRIPTION OF DRAWINGS

FIGS. 3 and 4 are partial perspective views showing the other examples of production respectively.

BEST MODE FOR CARRYING OUT THE INVENTION

Figure 1:
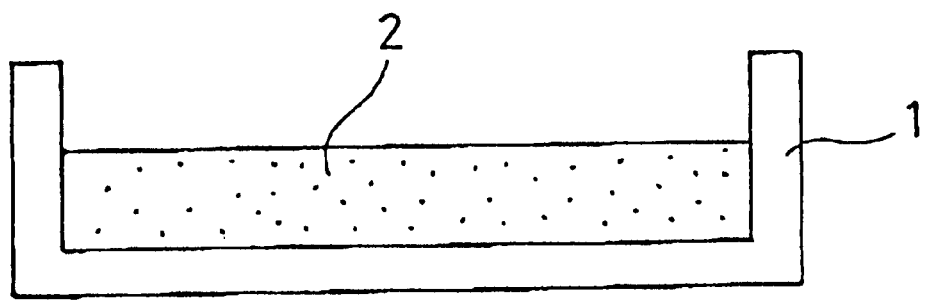
FIG. 1 is a flow chart showing production of an artificial stone of the present invention.
Figure 1:
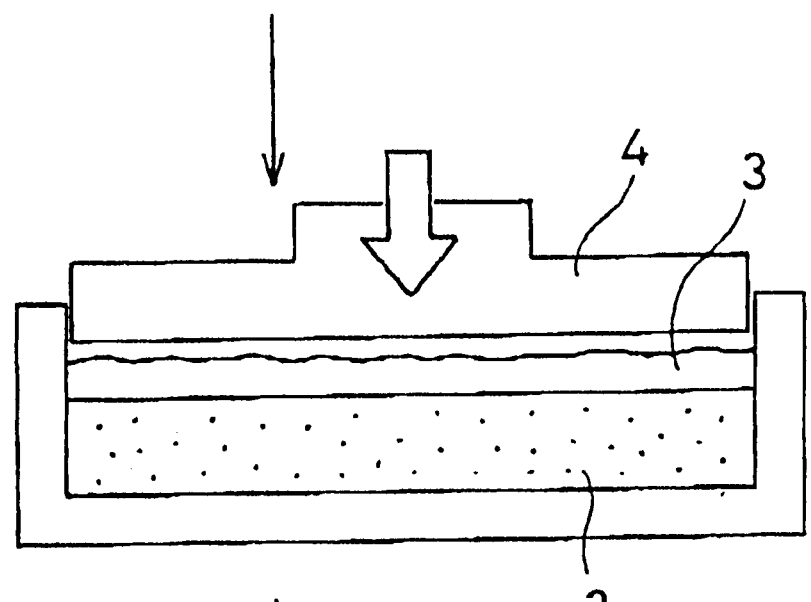
Figure 1:
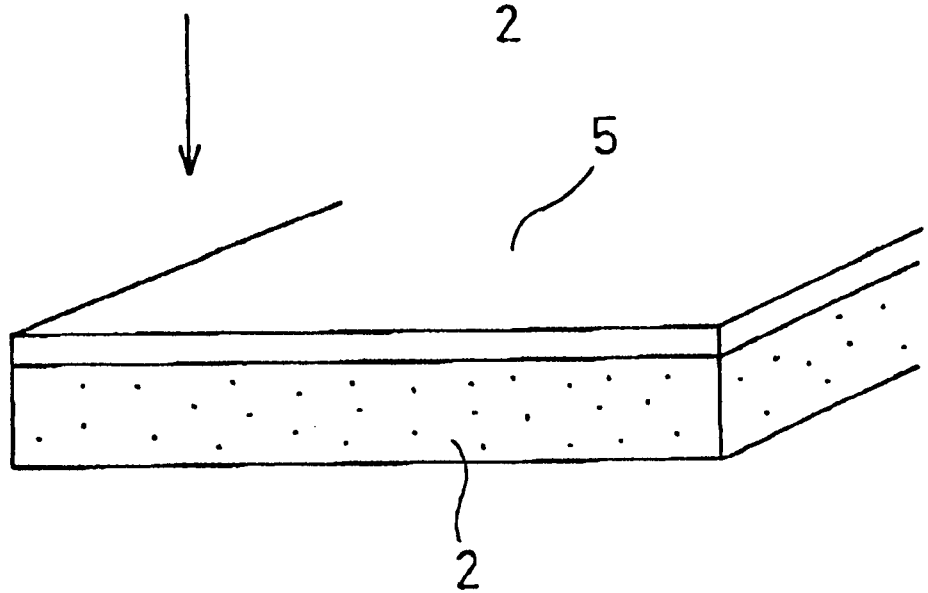

The mode for carrying out the present invention is described in more detail below.

First of all, the artificial stone mixture as a starting material constituting the artificial stone of the present invention is roughly composed of three components. One thereof is a fine powder component of an inorganic material having a size of from 5 to 70 mesh as a main component. This is a fine powder component of an appropriate inorganic material selected from minerals such as silica rock, chrysolite, feldspar, pyroxene, mica and the like, natural stones such as granite, metamorphite and the like, porcelain, glasses, metals and the like.

And along with this fine powder component, a finely divided component having a size of 100 mesh-under is used. As this finely divided component, various natural or artificial finely divided components are mentioned. For example, powders of calcium carbonate, aluminum hydroxide and the like are easily obtainable finely divided components.

Further, as a part of this finely divided component, a component such as manganese dioxide, titanium dioxide, zirconium silicate, iron oxide or the like to adjust a color tone, or a component such as antimony trioxide, a boron compound, a bromine compound or the like to impart a flame retardance may be blended.

A resin monomer component is mentioned as a third component. This resin monomer component is cured after struck and integrated, and it can be selected from a wide variety of thermosetting materials.

For example, this component constitutes an acrylic resin, a methacrylic resin, an unsaturated polyester resin or the like. Examples thereof include monomers such as an acrylate ester, a methacrylate ester and the like. Especially, from the standpoint of a color tone, physicochemical properties and the like of the artificial stone after the curing, methyl methacrylate is typically mentioned.

The fine powder component of a natural stone or the like acts as a main factor of an appearance and physical properties of the resulting artificial stone. Especially when a part thereof is exposed to the surface, it becomes a main factor of a color or a pattern in the appearance along with the other components.

The size of the finely divided component is much smaller than the 100 mesh level in comparison to the fine powder component. The finely divided component enters between the individual particles of the fine powder component and is arranged to fill the space between the particles, contributing toward providing properties such as a hardness and a pliability of the resulting artificial stone. The weight ratio of the fine powder component and the finely divided component is preferably between 0.5:1 and 5:1.

Further, this resin component contributes to covering the fine powder component and the finely divided component of a natural stone or the like which are components forming the above-mentioned structure to bind the whole body, and functions to impart a resilience or a tensile strength to a product when an artificial stone is completed.

In the present invention, the structural ratio of these components is important. Especially important is the structural ratio of the resin component and the other components.

In the present invention, one of the characteristics is that a high-density product having a dense texture can be provided. The "high-density" here referred to means that the fine powder component and the finely divided component contained in the artificial stone product are present at a high density. The degree thereof is that the density is, for example, 2.2 g/cm$^3$ or more exceeding the range included in the conventional artificial stone.

That is, the higher the structural ratio of the fine powder component of a natural stone or the like as an aggregate component in the product, the product is closer to the natural stone. However, when the ratio is too high, a product is not solidified, and it cannot be used as a commercial product. Further, physical properties of the resulting product are poor, and it cannot endure ordinary use.

Further, when the ratio of the finely divided component is too high, there occurs inconvenience that a product is not solidified. Besides, the resulting product is not glazed, and it can hardly be said as a stone.

Accordingly, the ratio of the fine powder component or the finely divided component is limited. That is, the weight ratio has to be 89% or more, preferably 90% or more. When it exceeds 95%, the product becomes brittle, and is hard to use. When it is less than 89%, the product is too soft to provide qualities as a stone, and it is used in the same range as a resin plate.

This means that the component other than the fine powder component and the finely divided component of a natural stone and the like, namely, the resin component should not be present in the product in an amount exceeding 11% by weight.

When the amount of the resin component exceeds 11%, the product is like plastics, and it is only seemingly an artificial stone. Further, when the amount of the resin component is excessively decreased, a product comes to have an appearance close to a natural color, but it becomes brittle and is unsuitable for actual use. From this standpoint, the amount of the resin component is more preferably between 3 and 10% by weight.

And in the artificial stone mixture of the present invention, it is one of the characteristics that a part or the whole of the above-mentioned fine powder component of the inorganic material is transparent particles and the particles or the small mass is previously coated with an inorganic or organic material.

Such a coating of the transparent fine powder component is conducted by coating the surface of the transparent fine powder component with a resin and curing the same, or by baking an inorganic material such as a water glass, a glazing agent for porcelain or the like and coating the same thereon. In either case, a coating with a thickness of from several micrometers to several tens of micrometers, for example, from 5 to 50 μm, more preferably from 20 to 30 μm is applied to the surfaces of the particles of the transparent fine powder component. More specifically, an inorganic material coating can be applied by, for example, heating a composition of an acrylic resin, a methacrylic resin, an unsaturated polyester resin or the like at from 150 to 300° C. or irradiating the same with light to coat the resin composition on the surfaces of the particles of the fine powder component and cure the same, or conducting the baking at a high temperature of from 800 to 1,100° C. using a water glass, a glazing agent or the like.

These coatings much improve the affinity for the overall structure of the fine powder component acting as an aggregate of an artificial stone. Further, the mixing of the fine powder component with the resin component increases a strength and gives a good surface hardness.

It is further important that since the above-mentioned transparent natural stone or the like is used as the fine powder component and the above-mentioned hard coating is applied to the surface thereof, this coated layer is partially broken by polishing the surface of the artificial stone product. Then, the surface structure between the particles of the partially exposed transparent fine powder component of the inorganic material and the surrounding coated layer comes to have a peculiar effect by light reflection.

That is, light is entered into the transparent fine powder component, reflected on the surrounding coated layer, permeated again through the transparent fine powder component, and reflected. Such a phenomenon of permeation and reflection is substantially different from ordinary reflection on a surface of an artificial stone alone, and gives a peculiar deep feeling to the artificial stone product of the present invention. A massy, deep, high-quality marble-like artificial stone is obtained.

The ratio of the transparent fine particle component having the coated layer as mentioned above can be generally between 10 and 100% based on the total amount of the fine powder component of the inorganic material contained in the composition.

In the present invention, it is necessary that the fine powder component of the inorganic material has the specific size as noted above. That is, the fine powder component of the inorganic material has a size of from 5 to 70 mesh as mentioned above. It is advisable to use the same size except in special cases. When an upper or lower portion is colored dark using the colored and colorless materials, it is considered that the size of fine particles is changed depending on the colored or colorless condition. However, fine particles which are extremely different in the size shall not be used in large amounts because they deteriorate the strength of the product.

Meanwhile, the size of particles of the finely divided component is 100 mesh-under as noted above. The particles of the finely divided component have to be fully incorporated between the particles of the fine powder component. Accordingly, particles having a size close to that of the particles of the fine powder component are undesirable. More specifically, the size is preferably between 150 and 250 mesh.

And what is important in the artificial stone of the present invention is that the artificial stone mixture is preferably dispersed uniformly in any portions of the cured portion after the striking except in special cases.

And it is advisable to polish the outer surface of the cured portion. That is, it is advisable that the partially broken fine powder component of the coated layer is exposed to at least a part of the surface as mentioned above.

The polishing is a practically convenient method for exposing to the surface a dense texture provided by the deep, high-density artificial stone of the present invention. It is of course possible that a part of a surface of a product is polished to expose a fine powder component and a difference between this portion and the other portion of the same surface is used as a pattern.

In the case of obtaining an artificial stone, it is an important subject what color or design a targeted natural stone has. Granite or marble is often targeted because a product from a natural stone is hard to obtain and the color and the glaze are beautiful. In this instance, the color and the glaze are important subjects in determining the value of granite or marble. Natural granite or marble has a vide variety of colors, namely, from an exactly black color to a white color or to a red color, and even one color is different in color tone.

Usually, when various artificial stones are colored, for example, when a black one is obtained, only a black powder of a natural stone or the like can be used. However, when a stone of a neutral color is obtained, a reproducibility is at issue. Further, even if a color was applied, it was difficult to give a glaze peculiar to marble.

For example, even when a color was applied using a dye or a pigment, it was difficult before to give a glaze or depth.

On the other hand, in the present invention, a transparent component is used as a fine powder component. For example, when a product having a granite-like or marble-like glaze is provided, a fine powder obtained by pulverizing a quartz-type natural stone can be used as the fine powder component.

Since a starting material of the fine powder obtained by pulverizing the quartz-type natural stone is a quartz type, the surface has the peculiar smooth portion. Further, it is colorless and transparent in many cases. When it is colored, the color tone is not strong. When it is not transparent, a transparency somewhat remains in many cases.

When this starting material is used, the color of the cured portion which has been struck and cured can be controlled by the color tone of the coated layer in the fine powder component and the resin component, and it can be deeply colored and glazed by the presence of the transparent quartz-type fine powder component.

For example, a baked layer of a water glass having a white pigment or a cured layer of a polyester-type unsaturated resin is provided as a coated layer. In this case, when a polyester-type unsaturated resin is used as a resin component, a color of a resin is generally a slightly yellowish white color, and the resulting product has then a glazed milk-white color, making it possible to provide a color tone similar to that of natural milk-white marble.

The coated layer is made to contain a coloring material such as a pigment, a dye or the like, and further an inorganic pigment such as titanium dioxide, zirconium silicate, manganese dioxide, iron oxide or cobalt oxide, an organic pigment such as an azo pigment or a phthalocyanine pigment, or various dyes are added to a resin component, making it possible to give a uniform color and a deep, glazed peculiar color tone.

Incidentally, in the artificial stone composition of the present invention, it is also possible to color a product by mixing a colored particulate component having approximately the same size as the fine powder component, as a color component.

In any case, the color reproducibility can be secured quite easily compared to the conventional artificial stone, and a stone which is excellent in depth and a glaze without discoloration is obtained.

Further, it is especially effective that a glazing agent for coloring a porcelain or the like is coated on a powder of a natural transparent fine powder component, and the coated material is baked to give a powder having a desired color which is used as a fine powder component. When using this method, not only can a stable color be provided, but also it can be selected from a wide range.

When a component which is obtained by pulverizing a guartz-type natural stone and which is the same as the fine powder component is used, coated with a glazing agent and baked, a reproducibility of a color such as black or red is provided without any anxiety. With respect to a color to be reproduced, not only the color but also a glaze or a color tone is completely reproduced. Accordingly, the color becomes one which cannot be given by a usual coloring method.

At any rate, the fine powder component in which the coated layer is formed by this baking is used at a ratio of from 10 to 100% based on the total amount of the fine powder component.

Further, in relation to the color tone, a short fiber component may be incorporated for reinforcing the texture of the molded product. Examples thereof include glass fibers, ceramic fibers, metallic fibers, resin fibers and the like. Of these, glass fibers are preferable.

With respect to the short fibers, those having a diameter of from 10 to 100 μm and a length of from 1 to 10 mm are used at a ratio of from 1 to 10% by weight of the fine powder component.

First, a cured slab into which to strike and integrate the above-mentioned artificial stone mixture is here described. This cured slab is one which has been cured, and the above-mentioned artificial stone mixture is struck and integrated thereinto upon placing or not placing the slab in a mold.

For example, FIG. 1 illustrates a method in which the above-mentioned artificial stone mixture (3) is injected on the above-mentioned cured slab (2) put on a mold (1), and cured by pressing the same using a press (4) to integrate the cured portion (5) into the cured slab (2). Further, FIG. 2 illustrates a method in which the artificial stone mixture (3) is injected into the mold (1), and the cured slab (2) is placed thereon and likewise pressed using the press (4).

Figure 2:
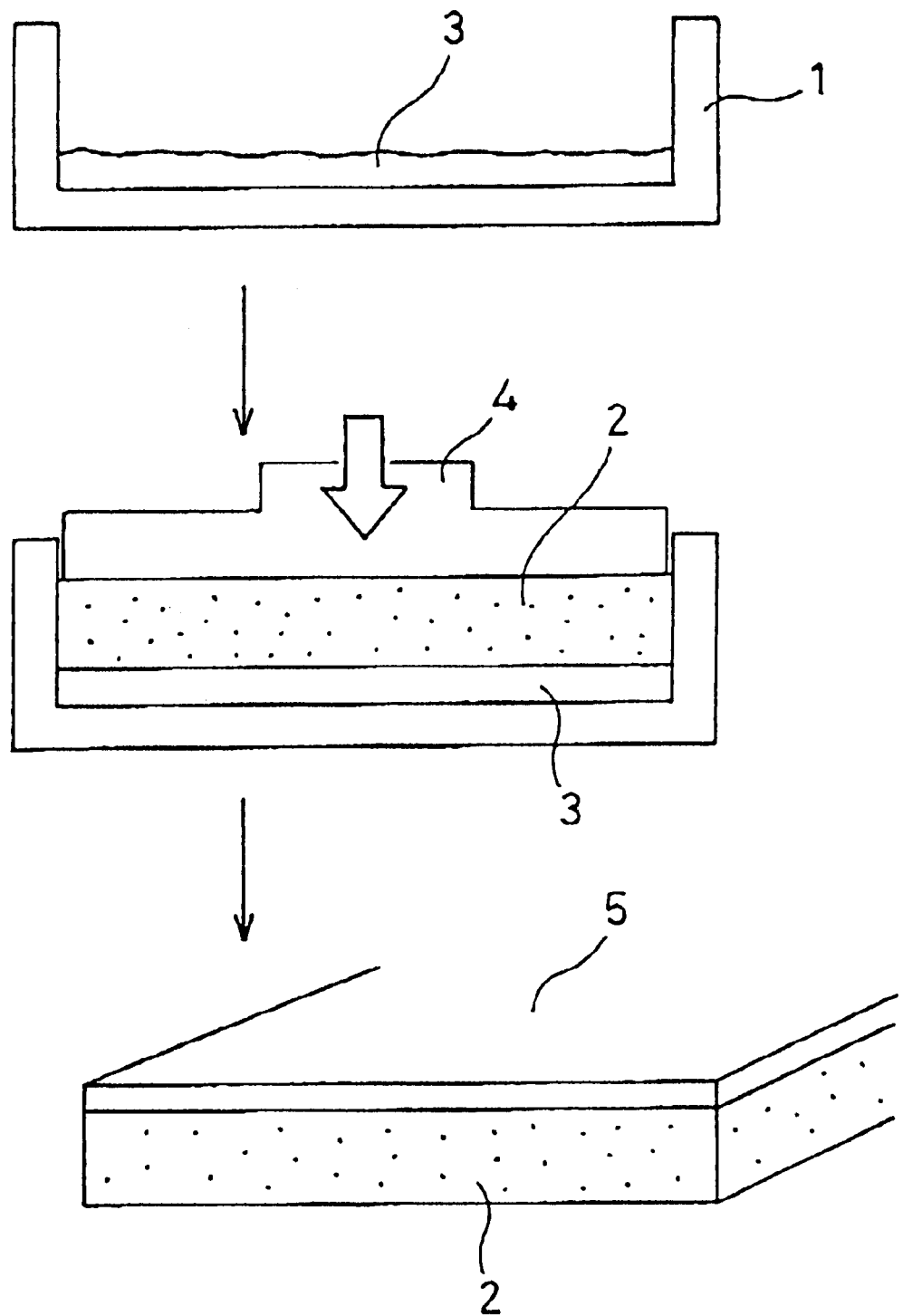
FIG. 2 is another flow chart.
Figure 3:
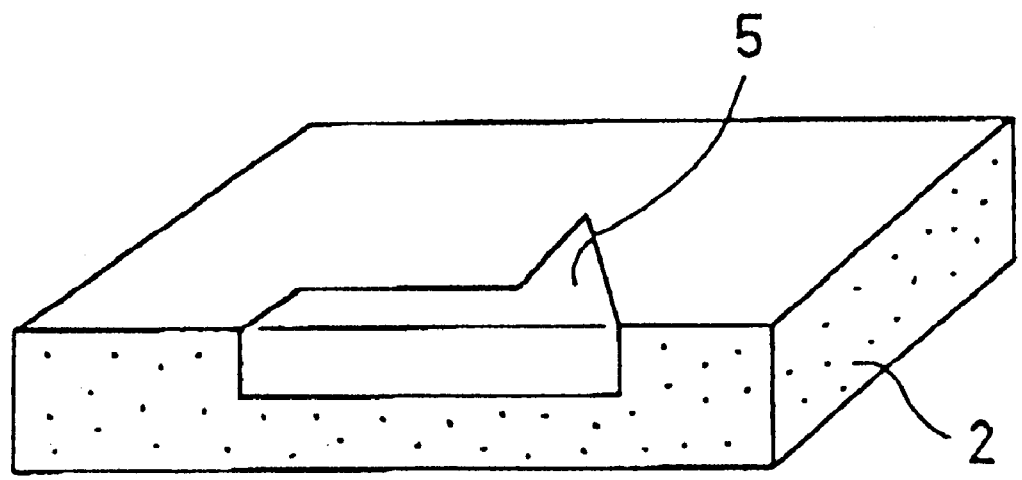

Of course, the method is not limited to the examples shown in FIGS. 1 and 2. As shown in FIG. 3, it is also possible that the artificial stone mixture (3) is struck into a predetermined notch or groove formed in the cured slab (2) as if it were embedded therein and the cured portion (5) is integrated thereinto. As shown in FIG. 4, it is further possible that the artificial stone mixture (3) is struck into the cured slab (2) having a metal body (6) of a predetermined shape or the like and the cured portion (5) is integrated thereinto. Thus, various modes are possible.

In any case, the cured slab (2) may include various compositions such as a cement type, a resin type, an inorganic cement type and the like. However, from the standpoint of the integration after the molding with the artificial stone mixture, namely, the adhesion, it is preferable that this cured slab contains a resin component and it contains a resin of the same quality as the artificial stone mixture as much as possible.

However, an inorganic material component, a color tone and the like of the cured slab are selected as required, and it can be composed of a less costly industrial waste such as a blast furnace slab, a glass or the like.

Accordingly, an artificial stone having a certain thickness can be formed such that a less costly cured slab is used as a lining material, its thickness is increased, and only the surface layer is formed by striking the above-mentioned artificial stone mixture formed of the costly material.

Naturally, it is also possible that the cured slab is formed with the same composition as the artificial stone mixture, and the artificial stone mixture is struck and integrated thereinto. Unlike the adhesion of the cured bodies to each other, the integration is realized upon providing a great strength without using an adhesive.

For example, the resin may be various thermosetting resins such as a methacrylic resin, an unsaturated polyester resin and the like. In these resins, a cured slab can be formed by using 60 to 90% by weight, based on the total amount, of a blast furnace slab, a pulverized glass, various inorganic slabs obtained from an incinerator or the like as a substitute component of an aggregate or the like. These can also be reused. The thickness of the cured slab relative to the thickness of the product formed by striking and integration varies depending on the use. For example, it may occupy approximately 95% of the overall plate thickness. Further, the cured slab may be formed with the same composition as the above-mentioned artificial stone mixture in the present invention as described earlier.

Still further, in the present invention, it goes without saying that a sandwich structure may be provided by striking the other artificial stone mixture (3) on the cured slab (2) in FIG. 2.

In any of the above-mentioned cases, the surface formed from the artificial stone mixture struck and cured is arranged to be a surface of a product.

Furthermore, in this description, an artificial stone obtained by previously forming a cured slab from the above-mentioned artificial stone mixture and striking and integrating a curable mixture corresponding to the cured slab containing the blast furnace slab or the like into this cured slab is also intended in the invention, and the present invention provides this artificial stone.

In this structure, the artificial stone of the present invention can also be made to have a luminousness or a fluorescence. This can be conducted by blending the above-mentioned artificial stone mixture forming at least the surface of the artificial stone with a luminous or fluorescent component.

It is a practical characteristic feature that at least a part of the fine powder component as a structural component is baked or coated at room temperature with the above-mentioned luminous material or fluorescent material.

In the aggregate of the transparent inorganic material, especially, the baked coating of the fine powder component, a coating having a thickness of from several micrometers to several tens of micrometers, for example, from 5 to 50 μm, preferably from 20 to 40 μm is applied to the surface of the particle in the transparent fine powder component. More specifically, the coating is applied by the baking at a high temperature of from 120 to 1,200° C.

The fluorescent material to be baked can include various fluorescent materials which have a luminescence or which emit light through ultraviolet-light irradiation, such as strontium aluminate, zinc sulfide and the like.

The baking is conducted not by various known methods, but by mixing the aggregate of the transparent inorganic material, for example, the above-mentioned fine powder component with a dispersion or a paste having dispersed therein a fine powder of a luminescent material such as strontium aluminate or the like and drying the mixture.

The room-temperature coating is conducted also using a transparent sticky material (binder) as the dispersion or the paste.

In this construction, light irradiated from outside reaches the internal coating material baked. Further, when a methacrylic resin (MMA resin) having an excellent transparency is used as a resin component, light is entered into the overall thickness direction of the artificial stone.

Consequently, the incident light is permeated into the inside, and light is emitted from inside. That is, the light absorption layer and the light-emitting layer become thick. For this reason, light can be stored for a short period of time, and a light-emitting efficiency is also increased.

Since only the surface of the fine powder component is coated, the luminous or fluorescent material is used in a small amount.

And in the present invention, a luminous or fluorescent material of 100 mesh-under having a luminescence or a light-emitting property accompanied by ultraviolet absorption may directly be contained as at least a part of the finely divided component. Typical examples thereof include a strontium aluminate luminescent material, zinc sulfide and the like. These various materials are used in the present invention.

The size of the finely divided component is much smaller than the 100 mesh level in comparison to the fine powder component. The finely divided component enters between the individual particles of the fine powder component and is arranged to fill the space between the particles, contributing toward providing properties such as a hardness and a pliability of the resulting artificial stone.

And the above-mentioned luminous or fluorescent component plays the same roll as the finely divided component, contributing toward imparting a light function such as a luminousness or a fluorescence to the artificial stone.

With respect to the above-mentioned inorganic material component, the size and the ratio are important.

The relationship of the weight ($W_1$) of the above-mentioned fine powder component of the inorganic material, the weight ($W_2$) of the finely divided component of the inorganic material and the weight ($W_3$) of the luminous or fluorescent component is preferably as follows.

$W_1$: ($W_2+W_3$)=1:2 to 5:1

$W_2$: $W_3$=1:2 to 10:1

With respect to $W_1$: ($W_2+W_3$), it is preferably between 1:1 and 4:1. With respect to $W_2$: $W_3$, it is preferably between 1:1 and 5:1.

And in the fine powder component of the inorganic material, it is advisable that the ratio of the fine powder component of the transparent inorganic material therein has preferably the following relationship (0.3 to 1.0)$W_1$.

The above-mentioned facts are required to realize physical properties as an artificial stone, such as a strength, a hardness, a density and the like, and a light function such as a luminousness or a fluorescence.

The light function of the luminous or fluorescent artificial stone is realized in such a manner that 1) from 30 to 100% by weight of the fine powder component of the inorganic material is a fine powder of a transparent inorganic material, and from 30 to 100% by weight of the finely divided component of the inorganic material is a finey divided component of a transparent inorganic material, and 2) a luminous or fluorescent component of 100 mesh-under is mixed at the above-mentioned specific ratio. Thus, the product is excellent in the luminousness and the economics in view of the use of an expensive luminous or fluorescent component.

The reason is as follows. The use of the fine powder component of the transparent inorganic material and further the finely divided component as a transparent aggregate helps permeate light irradiated from outside into the inside of the artificial stone to efficiently absorb the light energy in the luminous or fluorescent component, and the fluorescent layer having dispersed therein the luminous or fluorescent component formed of the luminescent material or the like is secured as a great thickness including the inside of the artificial stone, so that a high luminosity can be maintained for a long period of time. In the light emission, the fine powder component of the transparent inorganic material comes to have a high luminosity because it is good in a light transmission.

A process for producing the artificial stone of the present invention by striking and integrating the artificial stone mixture into the cured slab is realized by conducting the compression molding through, for example, pressing at a surface pressure of from 5 to 100 kgf/cm² in the above-mentioned press-molding. And in this molding, it is preferable to conduct heating at a temperature of from approximately 90 to 140° C. for from 5 to 20 minutes in the compression.

Further, in the compression molding with heating, vibration is applied to a mold along with a pressure, making it possible to improve a fluidity of the above-mentioned mixing material in the mold.

This process using such a compression molding exhibits a mass-production effect as a process for producing a product with a relatively simple shape, such as a flat molded product, and there is almost no loss of a material, so that the process is economically excellent too.

And in the present invention, the cured surface of the artificial stone mixture after the molding may be polished or roughened to expose the finely divided component to the surface.

As this roughening method, a method of selectively removing the resin component is employed. That is, it is effective, for example, that after the product is removed from the mold, high-pressure water is jetted on the surface of the molded product to conduct the texture treatment.

Since this treatment varies depending on various conditions such as a thickness, a distance from a nozzle, a treatment mode and the like, it is not limitative. However, usually, in the case of a thickness of from 2 to 20 cm, a water pressure of from 50 to 1,400 kg/cm² can be applied from a height of a nozzle of from 2 to 50 cm. This water pressure is far lower than when a natural stone is used.

That is, this is because the high-quality treatment can be conducted more easily by the presence of a resin component.

A nozzle for jetting high-pressure water or its system is not particularly limited. Various types are employable.

The surface is flattened or roughened using the water jet in the texture treatment to produce an artificial stone having a deep quality.

The presence of the resin component does not make the surface cloudy, and makes easy the treatment of a waste water in comparison to an etching method using chemicals.

Naturally, the surface can be treated with an organic solvent as required to soften or melt the resin component and partially remove the same.

In this case, the organic solvent corresponding to the resin component may be selected. Examples thereof include halogenated hydrocarbons such as methylene chloride and chloroform, carboxylic acids and esters thereof such as acetic anhydride, ethyl acetate and butyl acetate, acetone, tetrahydrofuran, DMF and DMSO.

The molded product is dipped in these organic solvents or these organic solvents are sprayed thereon or caused to flow down thereon to remove the resin component softened or melted from the surface whereby the uneven surface can be formed.

Alternatively, the uneven surface may be formed by scratching the resin component having a low hardness from the surface with a wire brush, a cutting means or the like.

The surface is roughened by the above-mentioned various means, and the texture is treated. Then, the resulting surface is polished to partially break the coated layer of the fine powder component on the surface and expose the coated layer and the particles of the fine powder component to the surface of the product as a section. Then, the peculiar deep, glazed surface quality is realized.

A means for surface polishing is not particularly limited. It can be conducted using a tool such as a grindstone, a polishing cloth, a polishing belt or the like, or a polishing agent such as a buff polishing agent, a rubbing compound or the like.

As the polishing agent, diamond, boron carbide, corundum, alumina and zirconia which have mainly a polishing action, and tripoli, dromite, alumina, chromium oxide and cerium oxide which have mainly a scratching action are used as required.

Of course, after such a polishing is applied, the surface may further be roughened to form raisings and depressions.

In this manner, the artificial stone having an excellent texture, excellent qualities and light-emitting properties is produced.

The present invention is illustrated by referring to the following Examples. Naturally, the present invention is not limited to these Examples.

EXAMPLE

Example 1

A composition comprising 60% by weight of a blast furnace slag, 30% by weight of a pulverized natural stone having an average particle diameter of 10 mesh and 10% by weight of methyl methacrylate (containing a curing agent) was compression-molded in a mold. Then a cured slab having a thickness of 12 mm was obtained.

This was placed into a mold as shown in FIG. 1.

A natural silica rock having a particle diameter of from 10 to 25 mesh in which a baked surface layer with a thickness of approximately 30 μm had been formed at approximately 1,000° C. using a white glazing agent was used in an amount of 50% by weight based on the total fine powder component. The fine powder component and aluminum hydroxide of 230 mesh at the weight ratio of 2:1 were uniformly mixed in amounts of 90% by weight based on the total amount of the composition with 9% by weight of a methyl methacrylate monomer and 1% by weight of a curing agent to form a mortar-like artificial stone mixture.

This mixture was charged on a cured slab in a mold, and compressed at a temperature of 110° C. and a surface pressure of 30 kgf/cm$^2$ for 15 minutes to form a plate having a thickness of approximately 15 mm.

Subsequently, the surface cured from the artificial stone mixture was polished using a corundum polishing agent. Consequently, in the fine powder component having the baked coated layer, the partial sections of the baked layer and the fine powder component were exposed to the surface.

The resulting artificial stone had a deep milk-white color and a glaze of marble, and was free from bubbles in the inside or the surface. Thus, the composition was uniform.

The adhesion between the cured slab and the cured portion of the artificial stone mixture was satisfactory in the strength.

In a test according to JIS K-7112, the specific gravity was 2.02 Further, the water absorption was 0.10%. The other properties are as shown in Table 1 below.

TABLE 1

| Item | Results | Test conditions |
| --- | --- | --- |
| Bending strength | 30.28 kgf/cm | according to JIS A5209 |
| Compression strength | 1180 kgf/cm$^2$ | Crosshead speed 0.5 mm/min Load cell 2 tons |
| Impact strength | 3.78 kgf · cm/cm$^2$ | Pendulum impact test |
| Hardness | 976 kgf/mm$^2$ | Vickers hardness according to JIS Z-2244 |
| Linear expansion coefficient | 0.68 (× 10$^{-5}$K) | TMA (30 to 100° C.) |
| Abrasion resistance | 0.02 g | JIS A-5209 sand dropping-type abrasion test |

When the resulting product was used as a wall plate of a building, a wall having a deep, beautiful color tone of marble could be obtained. The production cost as an artificial stone product could be reduced to approximately 1/30 that of the plate 15 mm thick which was obtained without using the above-mentioned cured slab.

Example 2

A plate was obtained as in Example 1 using the following artificial stone mixture.

That is, a natural silica rock having a particle diameter of from 10 to 25 mesh in which a baked surface layer with a thickness of approximately 30 μm had been formed at approximately 1,000° C. using a strontium alminate luminescent material was used in an amount of 50% by weight based on the total fine powder component. The fine powder component and calcium carbonate having an average particle diameter of 230 mesh at a weight ratio of 2:1 were uniformly mixed in amounts of 89% by weight based on the total amount of the composition with 11% by weight of a methyl methacrylate (MMA) and 1.5% by weight, based on the MMA weight, of a curing agent to form a mortar-like artificial stone mixture.

This mixture was charged, and molded into a plate having a thickness of approximately 15 mm.

Subsequently, the surface was polished using a diamond grindstone and a silicon carbide.magnesia grindstone Consequently, in the fine powder component having the baked coated layer, the partial sections of the baked layer and the fine powder component were exposed to the surface.

The resulting artificial stone exhibited light-storing/light-emitting properties such as a luminousness in the overall thickness direction, had a deep milk-white color and a glaze of marble even in the daytime, and was free from bubbles in the inside or the surface. Thus, the composition was uniform.

In a test according to JIS K-7112, the specific gravity was 2.02. Further, the water absorption was 0.10%. The other properties are as shown in Table 2 below.

TABLE 2

| Item | Results | Test conditions |
| --- | --- | --- |
| Bending strength | 30.15 kgf/cm | according to JIS A5209 |
| Compression strength | 1058 kgf/cm$^2$ | Crosshead speed 0.5 mm/min Load cell 2 tons |
| Impact strength | 3.81 kgf · cm/cm$^2$ | Pendulum impact test |
| Hardness | 985 kgf/mm$^2$ | Vickers hardness according to JIS Z-2244 |
| Linear expansion coefficient | 0.69 (× 10$^{-5}$K) | TMA (30 to 100° C.) |
| Abrasion resistance | 0.03 g | JIS A-5209 sand dropping-type abrasion test |

Further, no abnormality was observed even in tests for an acid resistance and an alkali resistance by the dipping in a 3% hydrochloric acid aqueous solution for 8 hours and the dipping in a 3% sodium hydroxide aqueous solution for 8 hours.

When the resulting product was used as a wall plate of a building, a wall having a deep, beautiful color tone of marble could be obtained.

Example 3

A transparent glass having a particle diameter of from 5 to 50 mesh in which a baked surface layer had been formed with a thickness of approximately 40 μm at 700° C. using a strontium aluminate-type luminescent material was used in an amount of 40% by weight based on the total fine powder component. The fine powder component and a natural silica rock powder having an average particle diameter of 250 mesh at the weight ratio of 2:1 were uniformly mixed in amounts of 87% based on the total amount of the composition with 13% by weight of methyl methacrylate (containing 2.0% by weight of a peroxide-type curing agent). The mixture in a necessary amount was charged into a mold such that a thickness after the curing became 3 mm as shown in FIG. 2.

Subsequently, a cured slab 10 mm thick which had been cured was placed on this artificial stone mixture. This cured slab was formed from 30% by weight of a blast furnace slag, 20% by weight of a glass powder, 30% by weight of a pulverized natural stone and 20% by weight of methyl methacrylate (containing a curing agent) through compression molding.

After the cured slab was placed thereon, molding by pressing and heating was conducted to form a plate having a thickness of 13 mm.

Then, the surface was polished using a diamond grindstone and a silicon carbide magnesia grindstone. Further, only the resin portion on the surface was removed at a water jet pressure of 1,100 kg/cm² (nozzle diameter 0.75 mm, a jet distance 40 mm).

The resulting artificial stone had depth and a non-slip property in the daytime, and could be seen in the overall thickness direction at night for a long period of time because of the luminescence.

It could be used as a luminous guide mark building material in urgent power failure and thus as an effective artificial stone.

The adhesion strength of the adhered portion between the cured portion from the artificial stone mixture and the cured slab was great, and not problematic practically.

Example 4

The following components were uniformly mixed to form a mortar.

|  | (% by weight) |
| --- | --- |
| Transparent natural silica rock (10 to 70 mesh) | 50 |
| Aluminum oxide (average particle diameter 220 mesh) | 10 |
| Transparent silica rock powder (average particle diameter 200 mesh) | 10 |
| Strontium aluminate luminescent material (average particle diameter 200 mesh) | 20 |
| Methyl methacrylate (MMA) (containing a 0.15% peroxide-type MMA curing agent) | 10 |

The resulting mixture was charged into a mold, and molded into a plate having a thickness of 3 mm.

This plate was placed in the mold, and a curable mixture having the following composition was poured thereon.

| Blast furnace slag | 30% by weight |
| --- | --- |
| Glass powder | 10% by weight |
| Pulverized natural stone | 40% by weight |
| Methyl methacrylate (containing a curing agent) | 20% by weight |

After the pouring, compression was conducted at a temperature of 110° C. and a surface pressure of 40 kgf/cm² for 20 minutes.

A plate artificial stone having a thickness of 14 mm was obtained through this compression.

Then, the surface of this artificial stone was polished using a diamond grindstone and a silicon carbide.magnesia grindstone to adjust the thickness to 10 mm.

The resulting artificial stone exhibited light-storing/light-emitting properties such as a luminousness in the overall thickness direction, had a deep milk-white color and a glaze of marble even in the daytime, and was free from bubbles in the inside or the surface. Thus, the composition was uniform.

In a test according to JIS K-7112, the specific gravity was 1.98. Further, the water absorption was 0.10%. The other properties are as shown in Table 3 below.

TABLE 3

| Item | Results | Test conditions |
| --- | --- | --- |
| Bending strength | 29.97 kgf/cm | according to JIS A5209 |
| Compression strength | 1185 kgf/cm² | Crosshead speed 0.5 mm/min Load cell 2 tons |
| Impact strength | 4.08 kgf · cm/cm² | Pendulum impact test |
| Hardness | 997 kgf/mm² | Vickers hardness according to JIS Z-2244 |
| Linear expansion coefficient | 0.69 (× $10^{-5}$K) | TMA (30 to 100° C.) |
| Abrasion resistance | 0.02 g | JIS A-5209 sand dropping-type abrasion test |

Further, no abnormality was observed even in tests for an acid resistance and an alkali resistance by the dipping in a 3% hydrochloric acid aqueous solution for 8 hours and the dipping in a 3% sodium hydroxide aqueous solution for 8 hours.

When the resulting product was used as a wall plate of a building, a wall having a deep, beautiful color tone of marble could be obtained. Further, light stored from the sun in the daytime in fine weather maintained its effect with the high luminosity at night for a long period of time. A good quality was provided owing to the light-emitting portions having a thickness.

Example 5

In the formulation of Example 4, a ratio of a silica rock powder was changed to 20%, a ratio of a strontium aluminate-type luminescent material to 10%, a ratio of a natural silica rock to 62% and a ratio of methyl methacrylate (MMA) to 8% respectively, and the components were uniformly mixed. The mixture was molded into a plate having a thickness of 14 mm.

Then, the surface was polished using a diamond grindstone and a silicon carbide magnesia grindstone. Further, only the resin portion on the surface was removed at a water jet pressure of 1,100 kg/cm² (nozzle diameter 0.75 mm, a jet distance 40 mm).

The resulting artificial stone had depth and a non-slip property in the daytime, and could be seen in the overall thickness direction at night for a long period of time because of the luminescence.

It could be used as a luminous guide mark building material in urgent power failure and thus as an effective artificial stone.

Industrial Applicability

As stated above, the present invention provides a high-density artificial stone which has a deep, glazed excellent color tone that has not been provided so far as well as good characteristics at quite low costs. The resulting product is of a uniform quality which has not been found in a natural product. Besides, such an excellent product can be produced without using a special costly equipment.

Especially, the artificial stone of the present invention is suitable for providing a granite tone or a marble tone, and it can be used in the same manner as a natural stone. Further, a function of a luminousness comes to be realized.

The product can be used in a wall material, a floor material, a pillar or the like as a deep, high-quality product in a wider range than a natural product.

What is claimed is:

1. An artificial stone wherein an artificial stone mixture containing an inorganic material mixture component comprising a fine powder component of an inorganic material having a size of from 5 to 70 mesh and a finely divided component of an inorganic material of size not greater than 100 mesh in which the sum of the fine powder component of the inorganic material and the finely divided component of the inorganic material is 89% by weight or more based on the total amount, and 11% by eight or less, based on the total amount, of a resin monomer component, is struck and combined with and integrated into a cured slab.

2. The artificial stone of claim 1, wherein the cured slab is a resin-containing material.

3. The artificial stone of claim 2, wherein the cured slab contains an inorganic material mixture component in which the sum of the fine powder component of the inorganic material having the size of from 5 to 70 mesh and the finely divided component of the inorganic material of size not greater than 100 mesh is 89% by weight or less based on the total amount, and 11% by weight or less, based on the total amount, of a resin component.

4. The artificial stone of claim 3, wherein the resin component is a methacrylate ester resin.

5. The artificial stone composition of claim 1 or 3, wherein the fine powder component and the finely divided component are contained at a weight ratio of from 0.5:1 to 5:1.

6. The artificial stone of claim 1 or 3, wherein at least a part of the fine powder component or the finely divided component is a luminous or fluorescent material.

7. The artificial stone of claim 1 or 2, wherein the cured slab contains an industrial waste.

8. The artificial stone of claim 7, wherein the cured slab is formed of a cement or resin material.

9. The artificial stone of claim 7, wherein the industrial waste is blast furnace slag or a glass.

10. The artificial stone of claim 1 or 2, wherein the cured slab is formed of a cement or resin material.

11. The artificial stone of claim 1, wherein the resin monomer component is a methacrylate ester.

12. The artificial stone of claim 11, wherein the artificial stone mixture contains a resin.

13. The artificial stone of claim 11, wherein the artificial stone mixture contains an industrial waste.

14. The artificial stone of claim 13, wherein the industrial waste is blast furnace slag or a glass.

15. An artificial stone wherein a curable mixture is struck and combined with and integrated into a cured slab which is formed from an artificial stone mixture containing an inorganic material mixture component comprising a fine powder component of an inorganic material having a size of from 5 to 70 mesh and a finely divided component of an inorganic material of size not greater than 100 mesh in which the sum of the fine powder component of the inorganic material and the finely divided component of the inorganic material is 89% by weight or more based on the total amount, and 11% by weight or less, based on the total amount, of a resin monomer component.

16. The artificial stone of claim 15, wherein the resin monomer component is a methacrylate ester.

17. The artificial stone of claim 1, 15 or 3, wherein the surface of a part or the whole of the fine powder component of the inorganic material has an inorganic material layer or an organic material layer which has been coated and cured.

18. The artificial stone composition of claim 17, wherein the coated cured surface layer has a thickness of from 5 to 50 μm.

19. The artificial stone composition of claim 17, wherein at least 10%, based on the total amount, of the fine powder component has a coated cured surface layer.

20. The artificial stone composition of claim 17, wherein the fine powder component has a coated cured surface layer which is baked with a water glass, a pigment-containing water glass or a glazing agent for porcelain.

21. The artificial stone composition of claim 17 which has a coated cured surface layer formed of a pigment-containing resin.

22. The artificial stone of claim 17, wherein at least a part of the fine powder component is a transparent inorganic material of which the surface is baked with a luminous or fluorescent material or coated therewith at room temperature.

23. The artificial stone of claim 22, wherein the transparent inorganic material is a glass or silica rock.

24. The artificial stone of claim 22, wherein a ratio of from 5 to 40% by weight of the finely divided component of the inorganic material is a luminous or fluorescent material.

25. The artificial stone of claim 17, wherein at least a part of the fine powder component or the finely divided component is a luminous or fluorescent material.

26. The artificial stone of claim 15, wherein the curable mixture contains a resin.

27. The artificial stone of claim 15 or 26, wherein the curable mixture contains an industrial waste.

28. The artificial stone of claim 27, wherein the industrial waste is blast furnace slag or a glass.

* * * * *